United States Patent Office 3,752,835
Patented Aug. 14, 1973

3,752,835
PROCESS FOR PREPARING DIALKYLTIN DICHLO-
RIDE AND AN ALKYLLEAD CHLORIDE CO-
PRODUCT
Hymin Shapiro and Paul Kobetz, Baton Rouge, La., assignors to Ethyl Corporation, Richmond, Va.
No Drawing. Filed July 19, 1971, Ser. No. 163,990
Int. Cl. C07f 7/22
U.S. Cl. 260—429.7    14 Claims

ABSTRACT OF THE DISCLOSURE

A process for the production of dialkyltin dichloride compounds and an alkyllead chloride co-product by the reaction of tetraalkyllead and tin tetrachloride in the presence of a solvent is disclosed.

BACKGROUND OF THE INVENTION

Organotin halides, having the formula $R_2SnCl_2$ wherein R is an alkyl radical containing up to two carbon atoms, have been found particularly useful in the preparation of derivatives serving as stabilizers for chlorinated organic materials such as vinyl chloride resins, chlorinated paraffins, etc. Further, such halides have also been found valuable in the preparation of agricultural fungicides and as paint additives.

Various processes have been proposed for the production of these valuable compounds; however, such processes are not free of shortcomings and disadvantages. For example, one of the present commercial processes for the preparation of alkyl tin chlorides is the Grignard process, i.e. reacting stannic chloride with an alkyl magnesium chloride to form tetraalkyltin, followed by reaction with additional stannic chloride to form the desired alkyl tin chlorides. This process, however, has serious disadvantages and limitations in that the reaction is difficult to control on a large scale and is both laborious and time consuming. Another process comprises the reaction of powdered metallic tin with alkyl halides to provide dialkyl tin dihalides. This reaction also is disadvantageous in that rather poor yields are reported. A further process, which is described in U.S. 2,672,471, comprises heating a mixture of alkyl tin chlorides in a subatmospheric system to produce the desired dialkyl tin dichloride compound. This reaction though, is not economical in that subatmospheric pressures are required in conjunction with relatively high temperatures, i.e. 225° C.

Therefore, it is an object of this invention to provide a new process for the production of dialkyl tin dichloride compounds. It is a further object of this invention not only to provide a new process but also to provide an economical process for the production of such chlorides.

THE INVENTION

This invention relates to a process for the production of dialkyl tin dichloride and an alkyllead chloride co-product which comprises reacting tetraalkyllead with tin tetrachloride in an inert essentially anhydrous solvent in which the reactants and the dialkyl tin dichloride are soluble and in which the co-product is substantially insoluble. The preferred tetraalkyllead compounds are tetramethyllead and tetraethyllead, however other tetraalkyllead compounds such as tetrapropyllead, dimethyldiethyllead, dimethyldibutyllead, ethyltrimethyllead, trimethylbutyllead, triethylmethyllead, and the like may also be used. Other alkyllead compounds are described in U.S. 2,859,232, U.S. 3,028,322 and U.S. 3,088,885.

In particular, the process of this invention may be represented by either of the following two reactions:

(1) 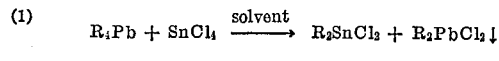

(2) 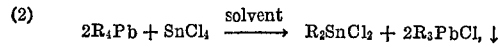

wherein R is alkyl with either methyl or ethyl being preferred. Of the two reactions shown above, from a commercial standpoint at least, reaction (1) is preferred as a smaller amount of tetraalkyllead reactant is required, i.e. one mole of tetraalkyllead per mole of tin tetrachloride.

Generally speaking, the solvents used are essentially anhydrous compounds which will dissolve both of the reactants and the dialkyl tin dichloride product but will not dissolve the alkyllead chloride co-product. Thus, in practicing the instant process only the co-product comes out of solution as a precipitate upon its formation. Further, the solvents are also essentially inert in the processes of this invention. The following is illustrative of solvents which can be used for the purposes of the invention. In reaction (1), when R is an ethyl radical, aromatic hydrocarbons such as benzene, toluene, xylene, mesitylene, etc., have been found to be particularly effective solvents. When the alkyl radical is a methyl radical in reaction (1) ethers and esters such as dimethyl ether, diethyl ether, dibutyl ether, diisooctyl ether, ethyl acetate, methyl acetate, propyl acetate, butyl acetate, amyl acetate, amyl formate, octyl propionate, hexyl butyrate, decyl octoate, etc., have been found to be effective solvents. It has also been found that, in reaction (2) when the alkyl radical is ethyl, various paraffinic hydrocarbons such as hexane, octane, dodecane, nonane and the like are excellent solvents. In reaction (2), if the alkyl radical is methyl, non-ether and non-ester solvents such as aromatic hydrocarbons, paraffinic hydrocarbons and amines have been found useful. Examples of such aromatics are benzene, toluene, xylene, etc. Illustrative paraffinic hydrocarbons which are useful have been found to be heptane, octane, pentane, nonane, decane and the like. Some examples of amines which are useful are trimethylamine, monoethylamine, monopropylamine, monobutylamine, diisoamylamine, triiisooctylamine, aniline, monomethylaniline, etc.

Other suitable solvents can be determined by running pilot experiments to measure the effectiveness of the candidate solvent against the criteria for solvents mentioned above.

Quantitatively, it has been found that the concentration of tetraalkyllead reactant present in the solvent should be fairly high, i.e. from about 5 to about 10 weight percent, based on the total weight of reactants and solvent. In relation to each other the reactants may be present in approximately equal molar quantities [see reaction (1)] or the reactants may be present in a molar ratio of tetraalkyllead to tin tetrachloride of approximately 2:1 [see reaction (2)]. Other molar ratios higher than 2:1 may also be used; however, such ratios merely result in a somewhat wasteful utilization of tetraalkyllead reactants without increasing the dialkyl tin dichloride output.

The conditions under which the reactions of this invention may proceed can be generally described as mild. The only requirement regarding the temperature and the pressure is that any combination of the two should result in the solvent-reactant mixture being below its boiling point. However, lengthy exposure to high temperatures should be avoided as they tend to decompose the alkyllead chloride co-product. Preferably, the temperature should be about room temperature, i.e. (25° C.) and the pressure should be about atmospheric.

Recovery of the dialkyl tin dichloride product from the solvent may be accomplished in various ways. For example, vacuum distillation of the solvent-dialkyl tin dichloride mixture will cause the solvent to vaporize thus leaving the dialkyl tin dichloride product as a solid which is easily recovered. Further, another mode of recovery is flash evaporation of the solvent above its boiling point at atmospheric pressure. In this mode as in the preceding example the solvent vaporizes leaving dialkyl tin dichloride in a solid form. Other modes will become obvious to those skilled in the art.

The tetraalkyllead compounds used as reactants in the process of this invention may be prepared by any of the well-known tetraalkyllead process routes. See for example U.S. 2,859,232, U.S. 3,028,323 and U.S. 3,088,885. A preferred route and a commercially significant route for producing the preferred tetraalkyllead compounds of this invention, i.e. tetramethyllead and tetraethyllead, is the well-known sodium-lead alloy-alkyl chloride process. This process is described at length in "The Organic Compounds of Lead" by Hymin Shapiro and F. W. Frey, pages 34-40.

The tin tetrachloride reactant of this invention may be prepared by the direct chlorination of tin. See the "Encyclopedia of Chemical Technology," Kirk-Othmer, 2nd edition, volume 20, page 316.

A further embodiment of this invention includes the utilization of the alkyllead chloride co-product as feed to a reaction which produces tetraalkyllead. The tetraalkyllead product can then be recycled to the principal reactions of this invention to be used as a reactant.

More particularly this embodiment comprises recovering the alkyllead chloride co-product as a precipitate from either reaction (1) or (2) of this invention by any suitable means such as centrifugation, decantation, filtration, etc. The recovered precipitate is then dried and fed to a mild steel autoclave which contains a solvent (e.g. ethyl chloride, methyl chloride, ethers and the like) and a sodium-lead alloy which comprises metallic sodium and lead in a ratio of 10 parts to 90 parts by weight.

The stoichiometric amount of the above sodium-lead alloy will be that amount of alloy sufficient to provide enough sodium to be equivalent to the chlorine found in the alkyllead chloride co-product. In other words, if the alkyllead chloride co-product is dialkyllead dichloride then two moles of sodium will be necessary for any one mole of co-product fed. If the co-product is trialkyllead chloride then one mole of sodium will be necessary per mole of co-product fed. Utilization of less or more than stoichiometric amounts are operable but are not economical.

It is also to be understood that the alkyllead chloride precipitate may be fed along with other alkyl chloride reactants such as ethyl chloride, methyl chloride and the like. When such mixtures are used the amount of sodium-lead alloy utilized will be that amount of alloy sufficient to provide enough sodium to be equivalent to the chlorine found in the alkyllead chloride and that chlorine found in a portion of the alkyl chloride.

The temperature of the reaction mass, which comprises the reactants and any products formed thereby, is about 70 to about 75° C. The autoclave is supplied with mixing type agitators to stir the reaction mass for a period of about 30 to 60 minutes. After the above period has elapsed and the co-product gases are vented the reaction mass is discharged into steam stills.

Steam is passed through the stills for about two hours; during this period the mass is agitated. This steaming removes residual dissolved alkyllead chlorides from the reaction mass. Subsequently the tetraalkyllead product is steam distilled. Materials such as sodium thiosulfate, soap and ferric chloride are usually added during the distillation. These act as anti-agglomerants, keeping lead from depositing as balls, sheets, or rings, and interfering with the distillation of tetraalkyllead and the removal of sludge residues.

The crude tetraalkyllead product is purified by air blowing or washing with a dilute aqueous solution of an oxidizing agent, such as hydrogen peroxide or sodium dichromate. This treatment removes organometallic impurities such as trialkylbismuth obtained on alkylation of the bismuth impurity in the reactant lead metal. Reactive sludges may result, if these organometallic impurities are not thus removed. After the purification step, the tetraalkyllead is washed with water to give a relatively pure chemical. The relatively pure tetraalkyllead is then recycled to be used as a reactant in the principal reactions of the invention, i.e. the reaction of tetraalkyllead with tin tetrachloride in the presence of a solvent.

Due to the thermal instability of the tetraalkyllead reactants of this invention it is usually desirable to add a thermal stabilizing compound to the tetraalkyllead reactant. Otherwise upon reaching sufficiently high temperatures, the tetraalkyllead compounds would undergo rapid thermal decomposition with the evolution of large quantities of gas, which may lead to violent explosions. Various thermal stabilizing compounds have been disclosed in the prior art. See for example U.S. 3,221,037, U.S. 3,221,038 and U.S. 3,221,039, all of which are incorporated within this application as if set forth fully herein. A preferred thermal stabilizing compound is toluene and which is usually present in the tetraalkyllead in an amount of from about 5 to about 40 weight percent, based upon the combined weight of the toluene and tetraalkyllead. The net result of having toluene as a thermal stabilizer present in the tetraalkyllead reactant is to have the toluene present as a portion of the solvent. Of course, if it is desired to practice this invention on a laboratory scale, the utilization of such a stabilizer is not absolutely necessary due to the small volume of tetraalkyllead reactant utilized, provided that safety precautions to protect the practitioner are employed.

To further illustrate the processes of this invention the following examples are presented.

EXAMPLE I 9.5 grams of tetraethyllead and 7.8 grams of tin tetrachloride were reacted at room temperature and atmospheric pressure in 50 milliliters of toluene for 5–15 minutes. This resulted in a solution of diethyl tin dichloride and toluene. Also a precipitate formed which weighed 9.0 grams. Analysis of this precipitate by standard colorimetric analysis showed it to be diethyllead dichloride. Thus, the reaction went according to the equation:

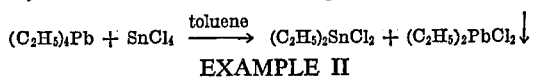

EXAMPLE II

The procedure of Example I was followed except that two moles of tetraethyllead were utilized and the solvent was hexane. A solution of diethyl tin dichloride and hexane was formed along with a precipitate which was analyzed as triethyllead chloride. Thus, the reaction went according to the equation:

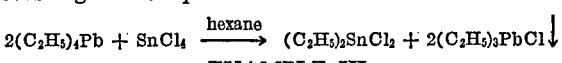

EXAMPLE III

The procedure of Example I was followed except that 5.3 grams of tetramethyllead and 5.0 grams of tin tetrachloride were utilized. A solution of dimethyl tin dichloride and toluene was formed along with a precipitate which was analyzed as trimethyllead chloride. Thus, the reaction went according to the equation:

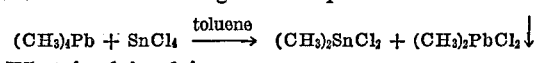

What is claimed is:

1. A process for the production of dialkyl tin dichloride and an alkyllead chloride co-product which comprises reacting tetraalkyllead with tin tetrachloride in an inert essentially anhydrous solvent in which the reactants and the dialkyl tin dichloride are soluble and in which the co-product is substantially insoluble.

2. The process of claim 1 wherein the tetraalkyllead reactant is tetraethyllead.

3. The process of claim 1 wherein the tetraalkyllead reactant is tetraethyllead and the solvent is an aromatic hydrocarbon.

4. The process of claim 1 wherein the tetraalkyllead is tetraethyllead and the solvent is a paraffinic hydrocarbon.

5. The process of claim 1 wherein the tetraalkyllead reactant is tetraethyllead, the solvent is an aromatic hydrocarbon and the mole ratio of tetraethyllead to tin tetrachloride is approximately 1 to 1.

6. The process of claim 1 wherein the tetraalkyllead is tetraethyllead and the solvent is a paraffinic hydrocarbon and the mole ratio of tetraethyllead to tin tetrachloride is approximately 2 to 1.

7. The process of claim 1 wherein the tetraalkyllead reactant is tetramethyllead.

8. The process of claim 1 wherein the tetraalkyllead reactant is tetramethyllead, the solvent is an ether or an ester and the mole ratio of tetramethyllead to tin tetrachloride is approximately 1 to 1.

9. The process of claim 1 wherein the tetraalkyllead reactant is tetramethyllead, the solvent is a compound selected from the group consisting of an aromatic hydrocarbon, a paraffinic hydrocarbon and an amine and wherein the mole ratio of tetramethyllead to tin tetrachloride is approximately 2 to 1.

10. The process of claim 1 wherein the tetraalkyllead is present in an amount of from about 5 to about 10 weight percent, based on the total weight of reactants and solvent.

11. The process of claim 1 wherein the tetraalkyllead is present in an amount from about 5 to about 10 weight percent, based on the total weight of reactants and solvent and wherein the reaction is performed at about room temperature and at about atmospheric pressure.

12. The process of claim 1 wherein at least a portion of said solvent is toluene.

13. The process of claim 1 wherein the mole ratio of the tetraalkyllead to the tin tetrachloride is approximately 1 to 1 and wherein:

(a) dialkyllead dichloride co-product is recovered as a precipitate from the solvent;
(b) the recovered precipitate is dried and then reacted with a sufficient quantity of a sodium-lead alloy to provide two moles of sodium per mole of dialkyllead dichloride fed;
(c) a tetraalkyllead product is recovered from (b) and;
(d) the tetraalkyllead product is utilized as a reactant in the reaction of tetraalkyllead and tin tetrachloride.

14. The process of claim 1 wherein the mole ratio of the tetraalkyllead to the tin tetrachloride is 2 to 1 and wherein:

(a) trialkyllead chloride co-product is recovered as a precipitate from the solvent;
(b) the recovered precipitate is dried and then reacted with a sufficient quantity of a sodium-lead alloy to provide one mole of sodium per mole of trialkyllead chloride fed;
(c) a tetraalkyllead product is recovered from (b) and;
(d) the tetraalkyllead product is utilized as a reactant in the reaction of tetraalkyllead and tin tetrachloride.

References Cited
UNITED STATES PATENTS 3,454,610   7/1969   Langer _____ 260—429.7

WERTEN F. W. BELLAMY, Primary Examiner

U.S. Cl. X.R.
260—437 R